Patented July 10, 1945

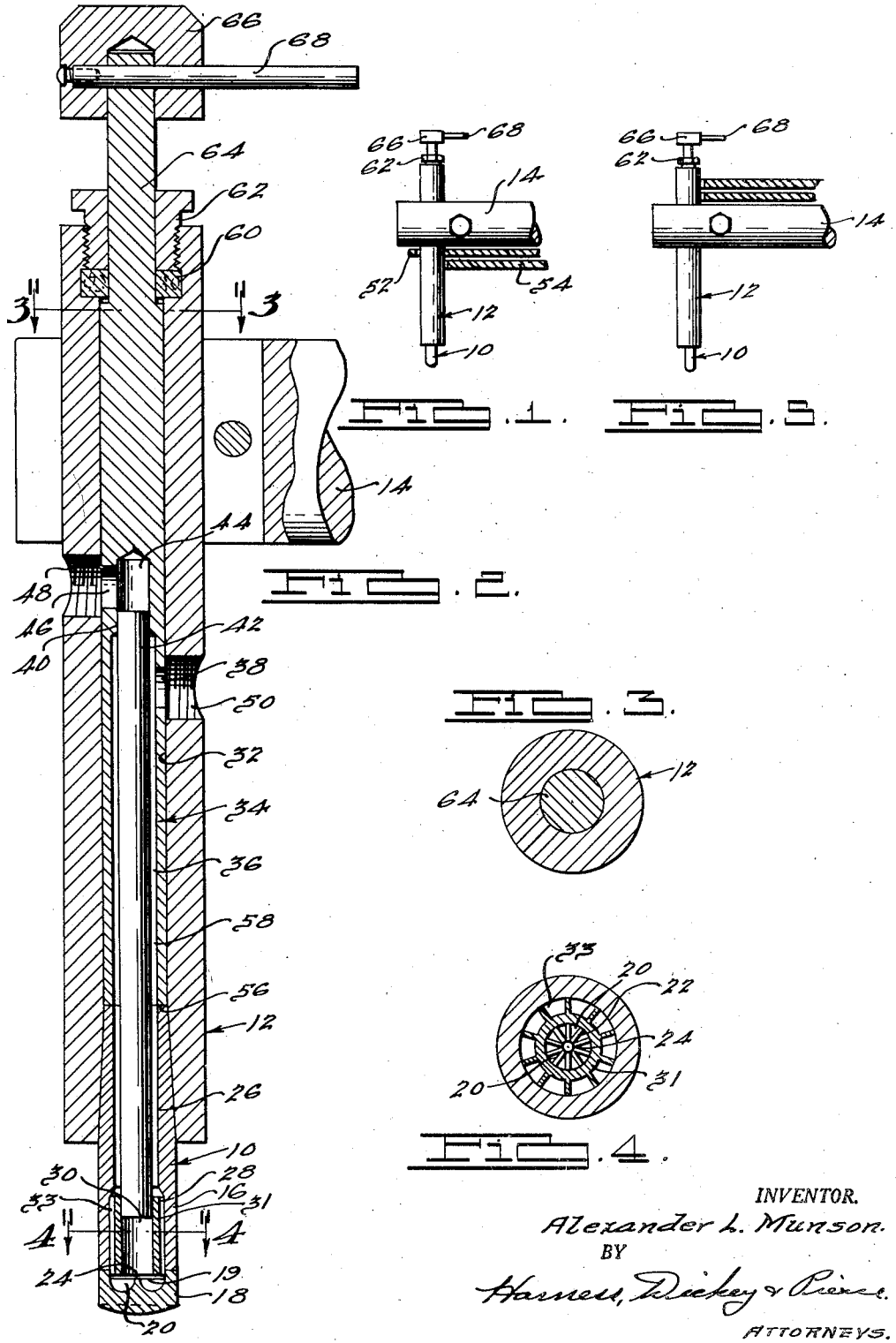

2,379,983

UNITED STATES PATENT OFFICE 2,379,983

WELDING MECHANISM

Alexander L. Munson, Detroit, Mich.

Application November 8, 1943, Serial No. 509,390

7 Claims. (Cl. 219—4)

The present invention relates to welding apparatus and in particular provides an improved knock-out type electrode assembly.

The principal objects of the invention are to provide an electrode assembly comprising a welding point, a holder therefor through which coolant may be supplied to the electrode, and further comprising a combined knock-out and coolant flow controlling element which is operable to close off the coolant lines to the holder and to remove the electrode; to provide such an assembly wherein said element is movable axially of the holder to knock-out the electrode and is rotatable relative to the holder to control the coolant passages; and to provide such arrangements which are simple in construction, economical in manufacture and assembly, and efficient and reliable in operation.

With the above, as well as other and more detailed objects in view, which appear in the following description and the appended claims, preferred but illustrative embodiments of the invention are shown in the accompanying drawing, throughout the several views of which corresponding reference characters are used to designate corresponding parts, and in which:

Fig. 1 is an outline view of an embodiment of the invention;

Fig. 2 is a view in longitudinal central section of the assembly shown in Fig. 1;

Fig. 3 is a view in horizontal section, taken along the line 3—3 of Fig. 2;

Fig. 4 is a view in horizontal section taken along the line 4—4 of Fig 2; and

Fig. 5 is a view corresponding to Fig. 1 but showing a different arrangement of the elements.

Referring first to Figs. 1 through 4, the illustrated assembly comprises an electrode or welding point 10 which is conventionally received within the tapered bore provided at the lower end of an associated sleeve-like holder 12. In accordance with conventional practice the holder 12 is supported on an arm 14 which may be associated with the frame structure of a conventional spot welding machine. The welding point 10 may be variously constructed but is illustrated as having a body 16 and a cap 18. The end of the cap 18 is suitably shaped to suit the particular welding duty, as will be understood, and is provided with a plurality of coolant receiving recesses 20 which are separated by ribs or fins 22. A central column 24 common to all of the recesses 20 rises from the center of the cap 18. The body 16 is provided with an upper bore portion 26, and a lower bore portion which receives a fluted insert 31 having radial projections 28 which, with the bore wall, define a plurality of circumferentially distributed outer passages 33. The insert 31 has a central bore 30. The passages 33 may correspond in number and spacing to the recesses 20 and are aligned therewith.

The holder 12 is provide with a cylindrical bore 32 which slidably and rotatably receives the knock-out and coolant control member 34. The member 34 is provided with a bore 36, which communicates with a coolant outlet 38 and which also has a reduced portion 40 which receives the upper end of a usual deflector tube 42. The upper end of the deflector tube 42 opens into the upper end 44 of the reduced bore portion 40, which portion communicates with the coolant inlet 46. In the normal or operating position of the member 34 the inlet 46 and the outlet 38 are rotatably aligned with corresponding inlet and outlet openings 48 and 50 provided in the wall of the holder 12. As shown, openings 48 and 50 are threaded, so as to accommodate the usual coolant lines 52 and 54.

The lower end of the member 34 normally abuts the upper end 56 of the welding point 10 and in this position of the parts the lower end of the deflector tube projects part way through the central bore portion 30 associated with the welding point. With this arrangement it will be appreciated that coolant introduced through the inlets 46 and 48 flows downwardly through the deflector tube 42 from whence it passes through the bore 30 and is distributed to the individual recesses 20 in the cap 18. The thus distributed coolant flows outwardly through the circumferentially spaced passages 33, all of which open into the annular space 58 which surrounds the deflector tube 42. The coolant is discharged through the outlets 38 and 50.

The welding point 10 has a drive fit within the tapered bore of the holder 12 and consequently leakage between these elements does not occur. Member 34 may be somewhat loosely received within the bore 32, and consequently, to prevent leakage at the upper end of the holder a usual packing gland 60 is held in place by the threaded nut 62.

The upper and reduced end 64 of the member 34 projects above the upper end of the holder 12 and is provided with a head 66. It is to be understood that the head 66 is formed to accommodate a blow from a hammer or other tool needed to drive the member 34 downwardly through the body of the holder 12, which action forces the welding point 10 out of the tapered bore of the holder 12. Preferably and as illustrated the head 66 is provided with an operating handle 68 by which it may be rotated so as to bring the respective inlets and outlets out of alignment with each other, it being understood that such a rotative movement is made before driving the member 34 downwardly.

Fig. 5 illustrates the adaptability of the present arrangement to different operating conditions. In this figure the coolant lines are introduced to the holder near the top thereof so that the coolant acts upon substantially the entire length of the holder. In Fig. 1 it will be noted that the coolant lines are introduced at a lower point, so that the cooling action is confined to a smaller part of the holder 12.

Although only a single specific embodiment of the invention has been described in detail it will be appreciated that various modifications in form, number and arrangement of the parts may be made without departing from the spirit of the invention.

What I claim is:

1. In combination, a work engaging element, a holder therefor having passages through which coolant may be supplied to the element, and a control member movably associated with said holder, said member being movable to forcibly separate the element from the holder and to control the effectiveness of at least certain of said coolant passages.

2. In combination, a work engaging element, a holder therefor having passages through which coolant may be supplied to the element, a valve member for controlling the effectiveness of at least certain of said passages, and means enabling said valve member to be moved relative to the holder so as to forcibly separate the element from the holder.

3. In combination, a work engaging element, a holder for supporting the element having passages through which coolant may be supplied to the element, a valve member supported by the holder for rotative and bodily movement, means enabling said rotative movement of the valve member to control the effectiveness of at least certain of said passages, and means enabling said bodily movement of the member to forcibly separate the element from the holder.

4. In combination, a work engaging element, a tubular holder therefor, a member slidably and rotatably received in the bore of the holder, said holder and said member having means defining passages through which coolant may be circulated therethrough for cooling the element, said passages arranged so that the rotation of the member within the holder closes off said passages and prevents said coolant flow, and said sliding movement of the member being effective to forcibly separate the element from the holder.

5. In combination, a work engaging element having in-flow and out-flow coolant passages, a holder for the element having a central bore, a valve member slidably and rotatably received in the bore, said valve member having inlet and outlet passages which communicate with the aforesaid passages in the element, said holder having in-flow and out-flow passages which normally communicate with the passages in the member, rotation of the member relative to the holder serving to bring the corresponding passages into or out of registry, and axial movement of the member relative to the holder serving to forcibly separate the element from the holder.

6. In combination, a holder for a work engaging element, said holder having a bore in which a said element may be received, and having passages through which coolant may be supplied through the holder to cool the element, and a control member movably associated with said holder, said control member being movable to forcibly separate a said element from the holder and to control the effectiveness of at least certain of said coolant passages.

7. In combination, a holder for a work engaging element, said holder having a bore in which a said element may be received, and having passages through which coolant may be supplied through the holder to cool the element, a valve member supported by the holder for rotation and bodily movement with respect thereto, means enabling said rotative movement to control the effectiveness of at least certain of said passages, and means enabling said bodily movement of the valve member to forcibly separate a said element from the holder.

ALEXANDER L. MUNSON.